United States Patent [19]

Angst

[11] 4,108,518
[45] Aug. 22, 1978

[54] BANQUET FOOD SERVING APPARATUS

[76] Inventor: Edy P. Angst, 3737 Woodside Dr., Carson City, Nev. 89741

[21] Appl. No.: 783,211

[22] Filed: Mar. 31, 1977

[51] Int. Cl.² ............................................. A47B 85/00
[52] U.S. Cl. ...................................... 312/305; 312/71; 312/253; 108/22
[58] Field of Search ............... 312/305, 135, 253, 311, 312/71; 108/22; 211/1.5

[56] References Cited

U.S. PATENT DOCUMENTS

| Re. 28,311 | 1/1975 | Cummings | 312/71 |
| 399,197 | 3/1889 | Hawkins | 312/71 |
| 406,555 | 7/1889 | Zettler | 312/305 |
| 2,401,417 | 6/1946 | Engle | 312/305 |
| 2,447,072 | 8/1948 | Jones | 108/22 |
| 2,736,628 | 2/1956 | Fadden, Jr. | 312/305 |
| 3,053,600 | 9/1962 | Holloway | 312/71 |
| 3,190,453 | 6/1965 | Shelley | 312/71 |
| 3,357,760 | 12/1967 | Shelley et al. | 312/71 |
| 3,437,057 | 4/1969 | Wulff | 108/22 |
| 3,503,346 | 3/1970 | Chan | 108/22 |

Primary Examiner—Kenneth Downey
Assistant Examiner—Victor N. Sakran
Attorney, Agent, or Firm—Phillips, Moore, Weissenberger, Lempio & Majestic

[57] ABSTRACT

Apparatus for preparing individual servings of food for a banquet type meal is disclosed which includes a carousel means for presenting empty plates for use in a plurality of vertical stacks and means for positioning cooked food in bulk adjacent such carousel means. Preferred embodiments of the apparatus are described in which the empty plates are automatically presented in a common plane for serving of bulk food thereon at each of three work stations with a fourth work station for the removal of filled plates and in which the empty plates may be stored and heated in the carousel prior to use. Design considerations for mobility and flexibility of the apparatus in use are disclosed.

10 Claims, 11 Drawing Figures

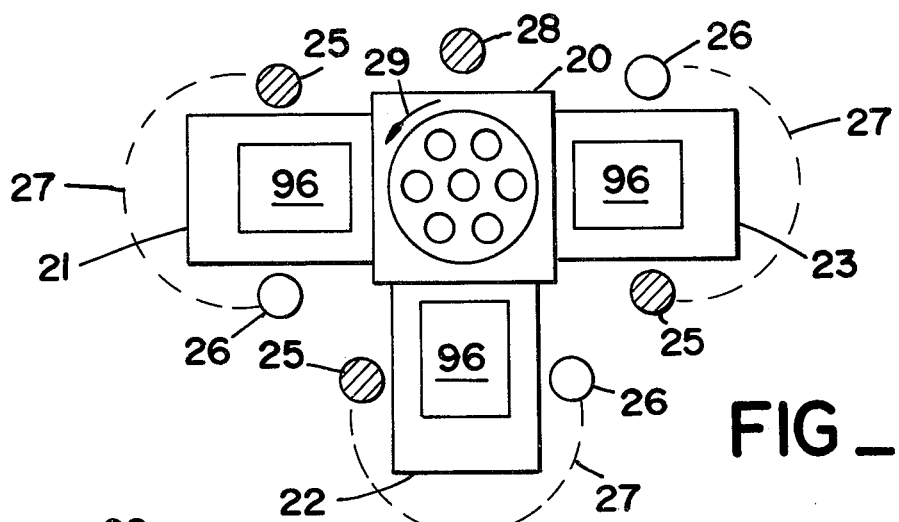
FIG_1
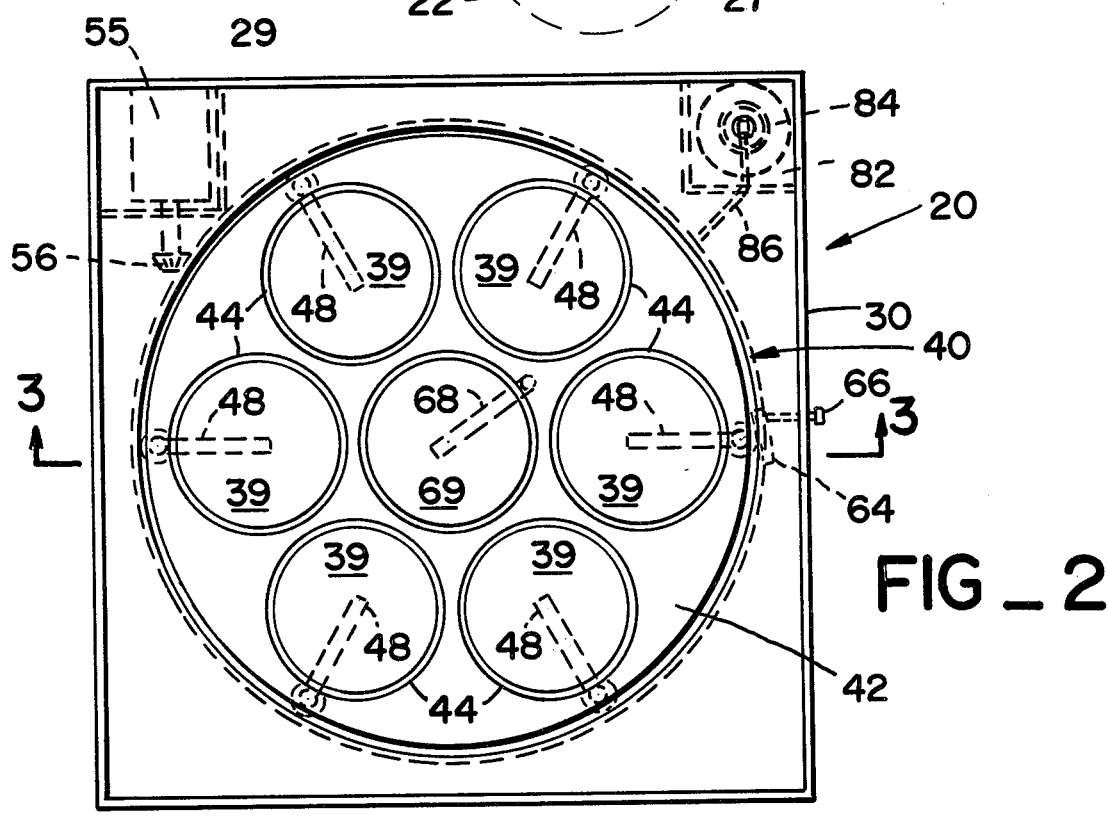
FIG_2
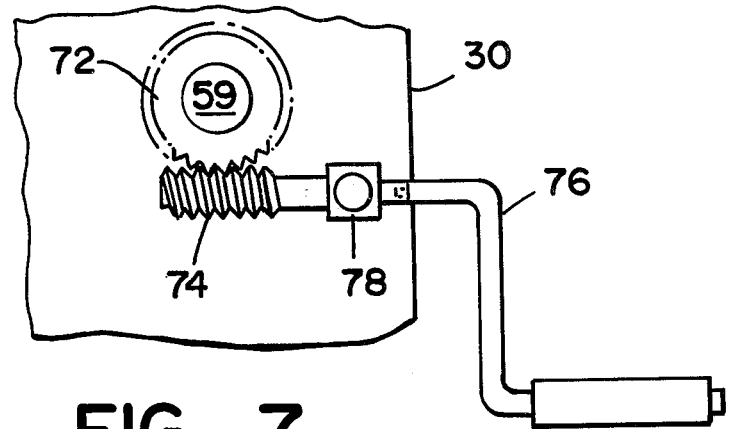
FIG_7
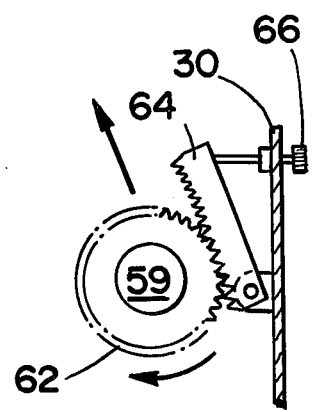
FIG_6

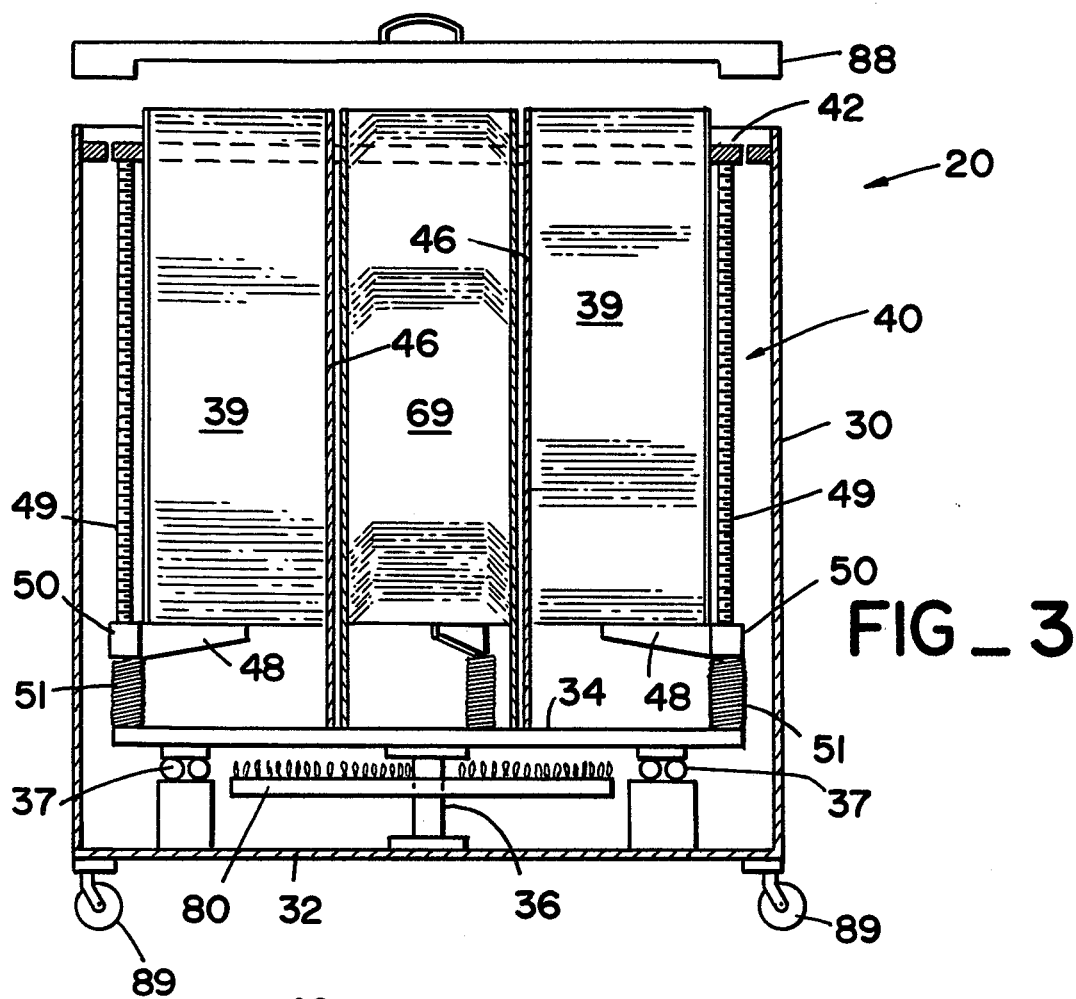
FIG_3
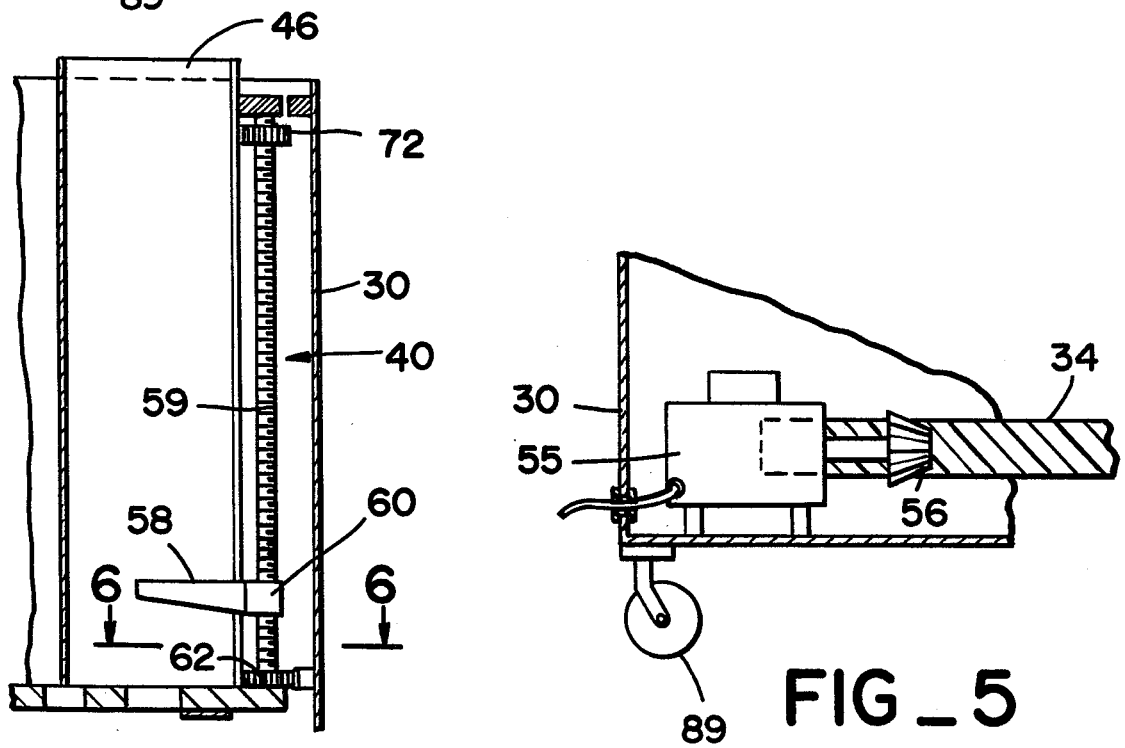
FIG_4   FIG_5

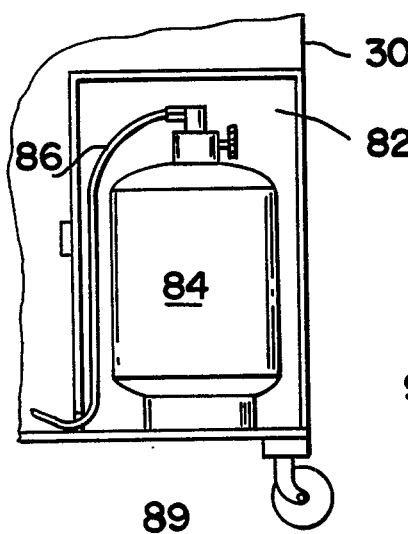
FIG_8
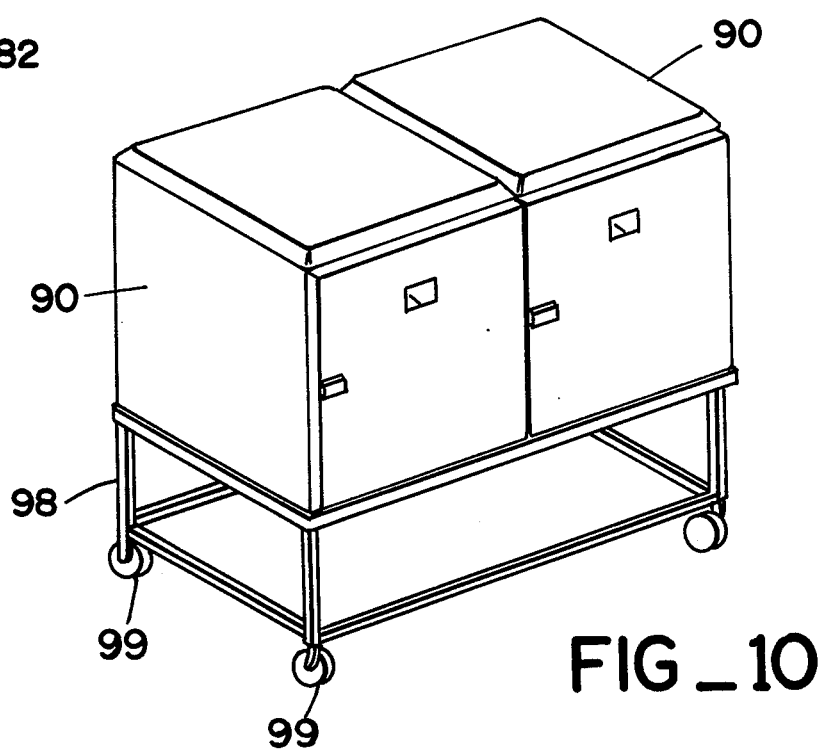
FIG_10
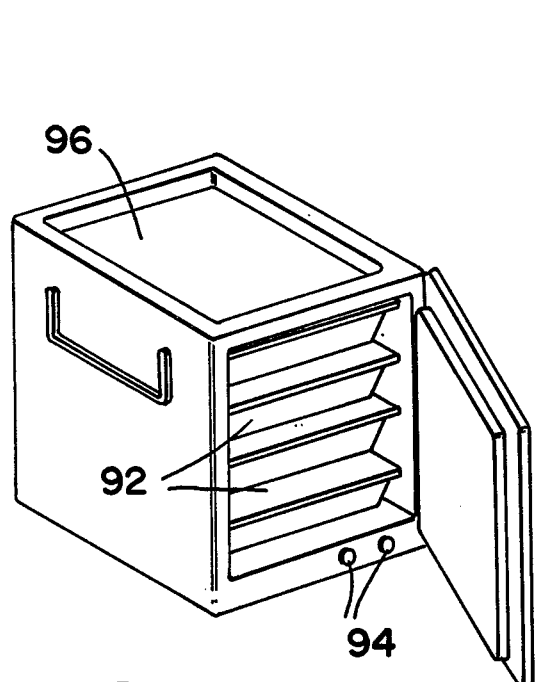
FIG_9
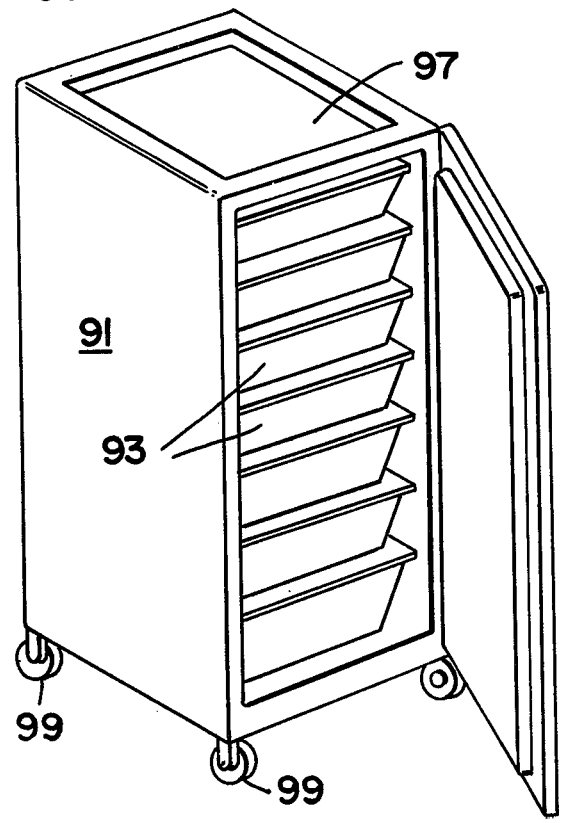
FIG_11

BANQUET FOOD SERVING APPARATUS

BACKGROUND OF THE INVENTION

This invention relates to apparatus for preparing individual servings of food for human consumption and more particularly to apparatus for preparing individual servings of food for a banquet type meal.

A banquet type meal entails the preparation and serving of a large number of substantially identical individual servings of hot food usually including meat or fish and two vegetables. The food is cooked in bulk and subsequently dished out onto a plurality of plates to provide the individual servings which are then distributed among the persons attending the banquet.

Assuming that the food is of high quality and properly cooked, there remain two basic elements of the process which are critical to the quality of the individual meals as served. The first of these is the cleanliness of the plates onto which the bulk food is served. At the present time, the plates and plate covers, if used, are washed at a dishwashing location and stacked for transport to the banquet kitchen. In the banquet kitchen they are restacked for storage prior to use. Several hours before the banquet takes place they may be placed in appropriate warming apparatus usually in stacks. In any event, prior to the banquet, they must be individually positioned and the bulk food dished out thereon. They must then await delivery to the individual persons at the banquet.

From the above it will be seen that in the prior art the plates are repeatedly handled after washing and before actual serving. Such handling not only requires many man-hours of labor but also causes a health hazard and tends to decrease the quality of the service.

It is an object of this invention to provide banquet food serving apparatus which reduces the required handling of empty plates after washing and prior to serving toward minimum.

The second element in the serving of a banquet type meal which is critical to the quality of the individual meals as served is the length of time between the preparation of the individual serving and the actual delivery thereof for consumption. Food may be kept warm in bulk for extended periods of time without excessive deterioration in quality. However, individual servings of food on plates tend to deteriorate rapidly in quality. Individual servings on plates tend to cool rapidly and if the plates are heated, the individual servings will tend to be rapidly overcooked. The division of a quantity of food into smaller quantities exposes more of the food to air increasing the danger of contamination, oxidization and excessive moisture loss.

However, at a banquet, a large number of individual servings must be delivered for consumption substantially simultaneously. Thus, in the prior art, it was necessary to prepare the individual servings well in advance of actual delivery thereof.

It is another object of this invention to provide banquet food serving apparatus which reduces the time required between the dishing out of the bulk food into individual servings and actual delivery of such servings for consumption toward minimum.

SUMMARY OF THE INVENTION

Briefly, the banquet food serving apparatus of this invention comprises a hollow tubular housing closed at one end and having sufficient volume to contain a substantial quantity of food serving plates in a plurality of vertical stacks. The housing is adapted to be supported at its closed end with its axis extending vertically. A turntable is mounted within the housing at the closed end thereof for rotation about the vertical axis of the housing. A plurality of support means are mounted on the turntable, each of the support means being adapted to support a vertical stack of food serving plates and to selectively move the vertical stack of food serving plates supported thereon along the vertical axis of the housing. A drive means is provided for rotating the turntable about the vertical axis of the housing. Means may be provided for selectively closing the open end of the housing and means may be provided for heating the interior of the housing. The support means may include means for automatically moving each vertical stack of food serving plates in an upward direction a distance equal to the thickness of one vertical plate for each rotation of the turntable and the drive means for rotating the turntable may comprise a drive motor mechanically coupled to the turntable to drive the turntable at a constant rate of rotation. The apparatus includes means for positioning cooked food in bulk at a plurality of work stations adjacent the housing.

BRIEF DESCRIPTION OF THE DRAWING

The foregoing and other objects and features of this invention will be more clearly apparent from a reading of the following detailed description of a preferred embodiment thereof in conjunction with the drawing wherein:

FIG. 1 is a top plan view showing the carousel means according to one embodiment of this invention with means positioning cooked food in bulk at three work stations about the carousel means with a fourth work station indicated for removal of filled plates from the carousel means.

FIG. 2 is an enlarged top plan view of the carousel means according to the embodiment of FIG. 1.

FIG. 3 is a cross-sectional view taken along lines 3—3 of FIG. 2.

FIG. 4 is a fragmentary side view in elevation showing the drive motor for rotating the turntable of the carousel means of FIGS. 2 and 3.

FIG. 5 is a fragmentary view showing a different embodiment of the support means at the right hand side of FIG. 3 in greater detail.

FIG. 6 is an enlarged fragmentary cross-sectional view taken along lines 6—6 of FIG. 5.

FIG. 7 is an enlarged fragmentary view showing a manual means for operation of the support means of FIG. 5.

FIG. 8 is a fragmentary side view in elevation of a lower corner of the housing of the carousel means of FIG. 2 showing a bottle of compressed gas for use in heating the housing.

FIG. 9 is a perspective view of a food warming oven of the type which may be used to maintain the temperature of cooked food in bulk and transport it into position adjacent the carousel means according to this invention.

FIG. 10 is a perspective view showing a pair of the food warming means of FIG. 9 mounted on a cart for transportation.

FIG. 11 is a perspective view of a larger type of means for maintaining the temperature of cooked food in bulk and transporting it to the carousel means according to this invention.

DETAILED DESCRIPTION OF PREFERRED EMBODIMENTS

Referring to FIG. 1, a top plan view of banquet food serving apparatus in accordance with the teaching of this invention is shown schematically. Thus, a carousel unit in accordance with a preferred embodiment of this invention is represented at 20. Similarly, three units positioning cooked food in bulk adjacent the carousel unit 20 are represented schematically at 21, 22 and 23, respectively. Work stations from which a person may conveniently dish individual servings of cooked food from the units 21, 22 and 23 onto plates carried by the carousel unit 20 are represented by the shaded circles 25, the unshaded circles 26 representing an alternate work station to which the person may move as indicated by dotted lines 27. The further shaded circle 28 in FIG. 1 represents a work station adjacent the carousel unit 20 at which a person may remove the plates from the carousel unit after the individual servings have been dished up thereon and place them on an appropriate tray or cart to enable delivery of the individual servings for consumption. The carousel unit may rotate in either a clockwise or a counterclockwise direction. However, for consistency in this application, it is assumed that the carousel unit 20 rotates in the counterclockwise direction as indicated by the arrow 29 in FIG. 1.

Referring to FIGS. 2 and 3, the carousel unit in accordance with the teaching of this invention is shown in greater detail, FIG. 2 being a top plan view of the unit 20 and FIG. 3 being a cross-sectional view of the unit 20 taken along line 3—3 in FIG. 2. The carousel unit 20 comprises a tubular housing 30 closed at one end 32. A turntable 34 is mounted for rotation within the housing 30 at the closed end 32 thereof as by means of a centrally located axle 36 and appropriate bearings 37 about the periphery of the turntable 34 between the turntable 34 and the closed end 32 of the housing 30.

As shown in FIG. 3, the axis of the tubular housing 30 is vertically oriented and support means are provided on the upper surface of the turntable 34 to support a plurality of vertical stacks 39 of dinner plates.

The support means 40 preferably comprises a circular upper plate 42 having a plurality of apertures 44 therethrough. The apertures 44 are arranged in circular array at the outer periphery of the circular plate 42 and each receives a tubular member 46 therethrough which extends into contact with and is fixed to the upper surface of the turntable 34. The free ends of the tubular members 46 may project upwardly from the circular plate 42 and such tubular members 46 are each dimensioned to receive a stack 39 of dinner plates.

According to this invention, the support means 40 includes means for moving each of the stacks 39 of dinner plates along the axis of the housing 30. According to the embodiment of this invention shown in the drawing, such means comprises a plurality of support arms 48 each projecting through a vertically extending slot through the sidewall of a tubular member 46 and beneath the vertical stack 39 of plates therein. Each of the support arms 48 is carried by a support rod 49 which extends parallel to the axis of the housing 30 having one of its ends mounted to the circular plate 42.

In the embodiment of this invention shown in FIG. 3, each of the support arms 48 projects from an integral hub 50 which is apertured to receive the associated rod 49 with a sliding fit. A compression spring 51 is provided about each of the rods 49 between the upper surface of the turntable 34 and the hub 50 of the support arm 48 associated therewith. Thus the weight of the stack 39 of dinner plates supported on the support arm 48 will tend to compress the spring 51 which may be dimensioned and designed to maintain the upper plate of the stack 39 at the free end of the tubular member 46 regardless of the number of plates in the stack 39.

As shown in FIGS. 2 and 5, the turntable 34 may be driven by an appropriate electric motor 55 to rotate in a counterclockwise direction as indicated by the arrow 29 in FIG. 2. Thus, the outer periphery of the turntable 34 may be provided with appropriate gear teeth adapted to be engaged by a worm gear 56 or other appropriate gear means operatively coupled to the drive shaft of the motor 55.

Referring to FIGS. 4 and 6, an alternate means of moving the stacks 39 of plates along the axis of the tubular housing 30 is shown. According to this embodiment, support arms 58 having hubs 60 with internally threaded apertures therethrough are mounted on externally threaded rods 59. Thus rotation of the rods 59 about their axis will cause the support arms 58 to move therealong due to interengagement of the internal threads of the hubs 60 with the external threads of the rod 59.

As best shown in FIG. 6, a pinion gear 62 is provided on the rod 59 at the lower end thereof. The pinion gear 62 is fixed to the rod 59 at the lower end thereof so that when the pinion gear 62 is driven, it will cause the rod 59 to rotate about its axis. A rack member 64 is mounted on the housing with its teeth adapted to engage the teeth of the pinion gear 62 as the pinion gear is carried into engagement therewith by rotation of the turntable 34. It will be understood that each of the rods 59 are journaled at their ends for rotation about their axis in the turntable 34 and the plate 42. The length of the rack 64 is sufficient to rotate the rod 59 by the number of turns required to raise a stack of plates 39 a distance equal to the thickness of one of the plates in the stack. As indicated in FIG. 2, the rack member 64 is preferably mounted on the housing 30 immediately prior to the final work station 28, at which the filled plates are removed from the carousel unit 20. Thus, each stack 39 of plates will be raised by the thickness of one of the plates for each rotation of the turntable 34 of the carousel unit 20.

The rack member 64 may be hinged at one end to the housing 30 and a set screw means 66 may be provided to enable the number of turns imparted to the threaded rod 59 by engagement of the rack member 64 and pinion 2 to be adjusted. More than one rack member 64 may be provided for engagement with the pinions 62 if desired.

In order to load plates into the carousel unit 20, the turntable 34 could be rotated in a reverse direction and plates loaded individually thereon. It will be understood that the support arms 58 would be lowered as the turntable 34 is rotated in a clockwise direction thus causing the plates to be received within the tubular members 36 as they are loaded thereon.

However, referring to FIG. 7, means may be provided for manually rotating the threaded rods 59 to lower the support arms 58. Thus, a further pinion gear 72 may be provided at the upper end of each of the threaded rods 59. An appropriate gear means such as worm gear 74 may be mounted on the housing 30 for selective engagement with the pinion gear 72 and adapted to be manually driven as by means of a removable crank 76. Thus the worm gear 74 may be mounted on the housing by a pivot means 78 to enable it to be selectively engaged with the pinion gear 72. The pivot means 78 may include a socket for receiving the crank 76 to enable the worm gear 74 to be engaged with the pinion gear 72 and the worm gear rotated to drive the pinion gear 72 and threaded rod 59 in either direction.

As best shown in FIGS. 3 and 8, means may be provided for heating the interior of the housing 30 to warm the stacks 39 of plates. To this end a gas burner 80 may be provided at the closed end of the housing 30 beneath the turntable 34. A compartment may be provided in the housing 30 which is accessible from the exterior of the housing 30 and adapted to contain a bottle 84 of bottled gas. An appropriate supply line 86 is provided to conduct gas from the bottle 84 to the burner 80. It will be understood that other means such as electrical resistor elements, for example, could be provided for heating the interior of the housing 30. As shown in FIG. 3, a lid 88 may be provided to close the open end of the housing 30 and thereby facilitate the heating of the interior thereof.

The carousel unit 20 is adapted to be supported at its closed end with its axis in a vertical direction. Preferably the carousel unit 20 is provided with caster wheels 89 at its closed end so that it may be easily moved to a desired position for utilization.

The housing 30 of the carousel unit 20 is preferably substantially square, although it could also be circular or have any number of sides. In the embodiment shown, the carousel unit has an axial length of approximately 42 inches (1 meter) and has a cross-section in the form of a square approximately 40 inches (1 meter) on each side. The turntable 34 and top plate 42 have a diameter of approximately 36 inches (less than 1 m). The unit will hold 360 dinner plates in six stacks of 60 plates each. The plates will be presented for use in a common plane at a height convenient for the average person.

As shown in FIGS. 2 and 3, a support structure located centrally of the unit may be provided for receiving a stack 69 of plate covers. To this end a centrally located aperture similar to apertures 44 is provided in the top plate 42 and a slotted tubular member similar to tubular members 46 is mounted through such aperture on the turntable 34. A further support arm 68 may be mounted as described hereinabove with respect to support arms 48 through the slot in the tubular member 46 for supporting the stack of plate covers 69 and maintaining the top plate cover of the stack at the upper surface of the top plate 42.

Referring to FIG. 9, an oven 90 for maintaining the temperature of cooked food suitable for use in the apparatus of this invention is shown. The oven 90 is adapted to receive a plurality of hotel trays 92 containing cooked food. Means are provided for heating the interior of the oven 90 with appropriate controls 94 for setting the desired temperature.

The upper surface of the oven 90 is provided with a steam table 96 adapted to receive the hotel trays 92 while the food is being dished therefrom onto the plates.

As shown in FIG. 10, a plurality of ovens 90 may be mounted on a cart 98 in order to support the ovens at a convenient height and enable them to be moved to the desired position adjacent the carousel unit 20. Referring to FIG. 11, a larger oven unit 91 is shown for accommodating larger hotel pans 93 as appropriate for serving larger banquets. The oven unit 91 has a height approximately equal to the height of the carousel unit 20 and is provided with a steam table means 97 on its upper surface. Appropriate casters 99 are provided to facilitate the movement of the oven unit 91 into position adjacent the carousel unit 20.

It is believed that those skilled in the art will make obvious modifications in the embodiments of this invention shown in the drawing and described hereinabove in order to adapt it for specific situations without departing from the invention as defined in the following claims. The housing 30, of course, preferably provides heat insulation to provide efficient warming of the plates and plate covers therein. The carousel unit need not be mobile and mechanisms for supporting and moving the stacks of plates along the axis of the housing differing from those specifically described herein could be used.

What is claimed is:

1. Banquet food serving apparatus comprising:
   a. a hollow tubular housing closed at one end and having sufficient volume to contain a substantial quantity of food serving plates in a plurality of vertical stacks, said housing being adapted to be supported at said closed end thereof with its axis extending vertically;
   b. a turntable mounted within said housing at the closed end thereof for rotation about said vertical axis of said housing;
   c. a plurality of support means mounted on said turntable, each of said support means being adapted to support a vertical stack of food serving plates within said housing and including means for selectively moving the one of said vertical stacks of food serving plates supported thereby along said vertical axis of said housing; and
   d. drive means for rotating said turntable about said vertical axis of said housing.

2. Banquet food serving apparatus as claimed in claim 1 wherein each of said support means includes a support arm mounted on a vertically extending rod and said means for selectively moving said vertical stack comprises means for moving said support arm along said vertically extending rod to maintain the uppermost food serving plate of said vertical stack in a given plane regardless of the number of food serving plates in said stack.

3. Banquet food serving apparatus as claimed in claim 2 including means for positioning cooked food in bulk adjacent said hollow tubular housing.

4. Banquet food serving apparatus as claimed in claim 3 wherein each of said support means includes a tubular member dimensioned to receive one of said vertical stacks of food serving plates and having a slot through the sidewall thereof extending parallel to the axis thereof, said slot being adapted to receive said support arm therethrough.

5. Banquet food serving apparatus as claimed in claim 4 wherein said support arm of each of said support means is mounted on said vertically extending rod by means of a hub having an aperture receiving said rod therehthrough in sliding engagement therewith and means are provided for urging said support arm of each of said support means to move along the axis of the vertically extending rod associated therewith.

6. Banquet food serving apparatus as claimed in claim 5 wherein said aperture of said hub of said support arm of each of said support means is internally threaded, said vertically extending rod associated therewith is externally threaded with the internal threads of said hub engagement with the external threads of said rod and said means for urging said support arm to move along the axis of said vertically extending rod associated therewith comprises means for rotating said vertically extending rod about the axis thereof.

7. Banquet food serving apparatus as claimed in claim 6 wherein said drive means for rotating said turntable about said vertical axis of said housing comprises a drive motor mechanically coupled to said turntable to rotate said turntable at a constant low speed.

8. Banquet food serving apparatus as claimed in claim 7 wherein said means for rotating said vertically extending rod of each of said support means comprises a pinion gear coupled to said vertically extending rod and rack gear means adapted to be brought into operative relation with said pinion gear during a portion of said rotation of said turntable about the axis of said housing.

9. Banquet food serving apparatus as claimed in claim 8 wherein said turntable includes an apertured plate in vertically spaced relation thereto, said tubular member of each of said support means being received through a different aperture in said apertured plate, and said vertically extending rod of each of said support means has one of its ends journaled to said turntable and the other of its ends journaled to said apertured plate.

10. Banquet food serving apparatus as claimed in claim 3 wherein said tubular housing has a square cross-section of given dimension, said turntable is circular having a diameter a few inches smaller in length than said given dimension of said square cross-section of said tubular housing and said means for positioning cooked food in bulk adjacent said tubular housing comprises three mobile units each positioning a different kind of cooked food in bulk at a different one of the sides of said square cross-section of said tubular housing.

* * * * *

UNITED STATES PATENT OFFICE
CERTIFICATE OF CORRECTION

Patent No. 4,108,518  Dated August 22, 1978

Inventor(s) Edy P. Angst

It is certified that error appears in the above-identified patent and that said Letters Patent are hereby corrected as shown below:

Column 4, line 50 - Delete "2" and substitute --62--therefor.

Column 6, line 59 - Change "therehthrough" to --therethrough--.

Column 6, line 67 - After "hub" insert --in--.

Signed and Sealed this

Nineteenth Day of June 1979

[SEAL]

Attest:

RUTH C. MASON
Attesting Officer

DONALD W. BANNER
Commissioner of Patents and Trademarks